(12) United States Patent
Wang et al.

(10) Patent No.: US 8,248,905 B2
(45) Date of Patent: Aug. 21, 2012

(54) METHOD OF PARALLEL BIT-WISE HOLOGRAPHIC DATA STORAGE SOURCE USING A PARALLEL LIGHT SOURCE

(75) Inventors: Xinghua Wang, Clifton Park, NY (US); Xiaolei Shi, Niskayuna, NY (US); Hua Xia, Niskayuna, NY (US); Victor Petrovich Ostroverkhov, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 21 days.

(21) Appl. No.: 12/905,853

(22) Filed: Oct. 15, 2010

(65) Prior Publication Data

US 2012/0092979 A1  Apr. 19, 2012

(51) Int. Cl.
*G11B 7/00* (2006.01)

(52) U.S. Cl. .................................................... 369/103

(58) Field of Classification Search ............. 369/44.14, 369/44.37, 103, 14, 112.05; 359/10, 11
See application file for complete search history.

(56) References Cited

U.S. PATENT DOCUMENTS

| | | | |
|---|---|---|---|
| 4,581,529 A * | 4/1986 | Gordon | 250/227.26 |
| 4,952,010 A * | 8/1990 | Healey et al. | 359/11 |
| 5,195,152 A | 3/1993 | Gupta | |
| 5,483,511 A | 1/1996 | Jewell et al. | |
| 5,535,189 A | 7/1996 | Alon et al. | |
| 5,574,712 A | 11/1996 | Alon et al. | |
| 5,825,743 A | 10/1998 | Alon et al. | |
| 5,917,797 A | 6/1999 | Kosoburd | |
| 5,974,019 A * | 10/1999 | Belser et al. | 369/112.05 |
| 6,212,148 B1 | 4/2001 | Hesselink et al. | |
| 6,272,095 B1 | 8/2001 | Liu et al. | |
| 6,501,571 B1 | 12/2002 | Wang et al. | |
| 6,545,968 B1 | 4/2003 | Oakley | |
| 6,671,235 B1 * | 12/2003 | Hawryluk et al. | 369/14 |
| 6,791,914 B1 | 9/2004 | Marchant | |
| 6,898,167 B2 | 5/2005 | Liu et al. | |
| 6,940,805 B2 | 9/2005 | Finkelstein et al. | |
| 7,301,879 B1 * | 11/2007 | Van Brocklin et al. | 369/94 |
| 7,388,695 B2 | 6/2008 | Lawrence et al. | |
| 7,453,611 B2 | 11/2008 | Raguin et al. | |

(Continued)

FOREIGN PATENT DOCUMENTS

EP 491458 6/1992

(Continued)

OTHER PUBLICATIONS

U.S. Appl. No. 12/949,621, filed Nov. 18, 2010, Xuefeng Wang et al.

(Continued)

*Primary Examiner* — Nabil Hindi
(74) *Attorney, Agent, or Firm* — Fletcher Yoder

(57) ABSTRACT

The present techniques provide techniques for outputting counter-propagating parallel light waves to pre-record a holographic data disk. The parallel light waves are transmitted through a holographic system via a fiber optic bundle including a plurality of polarization-maintaining (PM) optical fibers. Each of the PM optical fibers in the fiber optic bundle may have one or more of a different wavelength, a different coherence length, and a different polarization orientation to reduce crosstalk in the disk. Furthermore, the fiber optic bundle array is rotated to produce interference spots indicative of micro-holograms according to the data track pitch of the holographic disk over which the fiber optic bundle is outputting the light waves.

44 Claims, 6 Drawing Sheets

U.S. PATENT DOCUMENTS

| | | |
|---|---|---|
| 8,054,519 B2 * | 11/2011 | Su et al. ............... 359/10 |
| 2002/0110077 A1 | 8/2002 | Drobot et al. |
| 2005/0259304 A1 | 11/2005 | Someno |
| 2006/0087929 A1 * | 4/2006 | Assis et al. ........... 369/44.14 |
| 2007/0086309 A1 | 4/2007 | Yang |
| 2008/0089209 A1 | 4/2008 | Miyamoto et al. |
| 2008/0252951 A1 | 10/2008 | Knittel |
| 2009/0003153 A1 | 1/2009 | Yamatsu |
| 2009/0003177 A1 | 1/2009 | Tanabe |
| 2009/0052312 A1 | 2/2009 | Hayashi et al. |
| 2009/0080317 A1 | 3/2009 | Martinez |
| 2009/0147333 A1 | 6/2009 | Yamatsu et al. |

FOREIGN PATENT DOCUMENTS

| | | |
|---|---|---|
| EP | 1494221 | 1/2005 |
| EP | 1522999 | 4/2005 |
| EP | 2104098 | 9/2009 |
| WO | WO2006064426 | 6/2006 |

OTHER PUBLICATIONS

U.S. Appl. No. 12/949,628, filed Nov. 18, 2010, Xuefeng Wang et al.

U.S. Appl. No. 12/907,824, filed Oct. 19, 2010, Victor Petrovich Ostroverkhov et al.

* cited by examiner (MULTIPLE PICKUPS)

(MULTIPLE CHANNELS IN A SINGLE PICKUP)

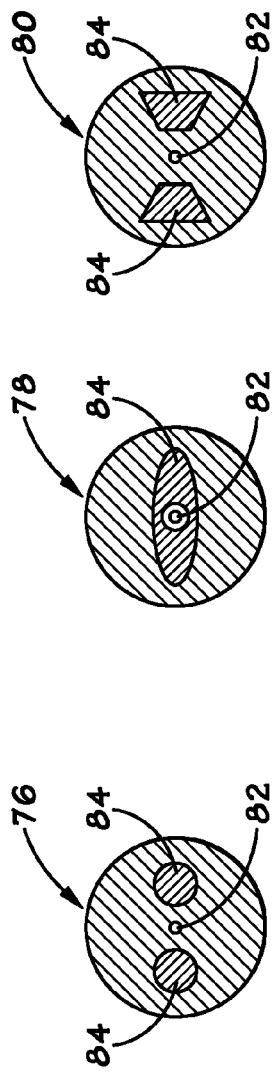
FIG. 6A
FIG. 6B
FIG. 6C
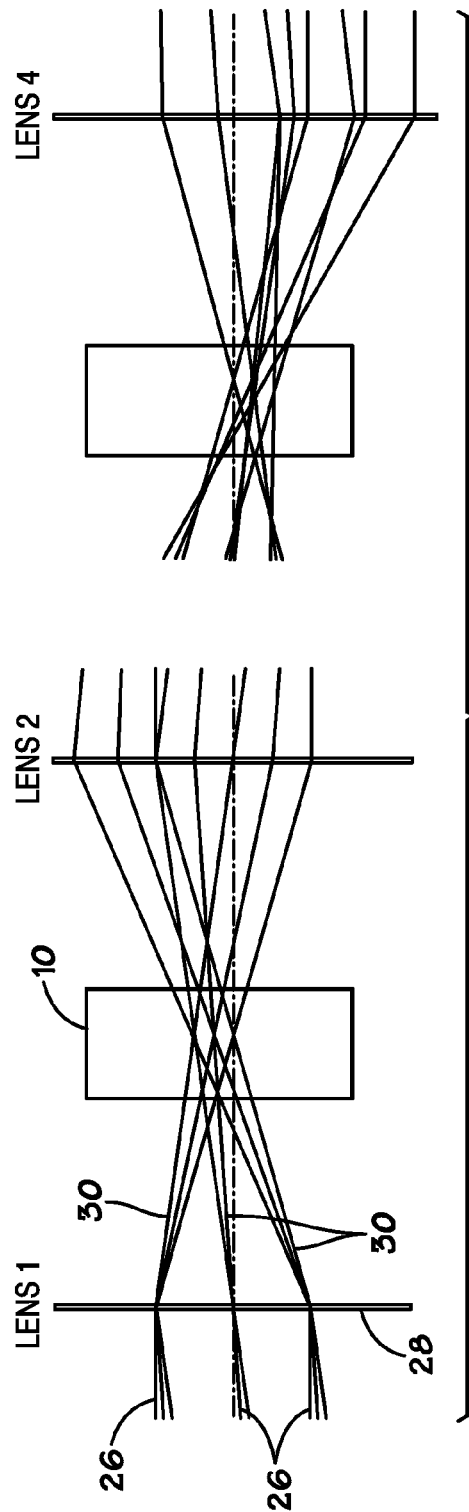
FIG. 7

METHOD OF PARALLEL BIT-WISE HOLOGRAPHIC DATA STORAGE SOURCE USING A PARALLEL LIGHT SOURCE

BACKGROUND

The present techniques relate generally to bit-wise holographic data storage techniques. More specifically, the techniques relate to methods and systems for parallel replication in holographic disks.

As computing power has advanced, computing technology has entered new application areas, such as consumer video, data archiving, document storage, imaging, and movie production, among others. These applications have provided a continuing push to develop data storage techniques that have increased storage capacity and increased data rates.

One example of the developments in data storage technologies may be the progressively higher storage capacities for optical storage systems. For example, the compact disk, developed in the early 1980s, has a capacity of around 650-700 MB of data, or around 74-80 minutes of a two channel audio program. In comparison, the digital versatile disk (DVD) format, developed in the early 1990s, has a capacity of around 4.7 GB (single layer) or 8.5 GB (dual layer). Furthermore, even higher capacity storage techniques have been developed to meet higher demands, such as the demand for higher resolution video formats. For example, high-capacity recording formats such as the Blu-ray Disc™ format is capable of holding about 25 GB in a single-layer disk, or 50 GB in a dual-layer disk. As computing technologies continue to develop, storage media with even higher capacities may be desired. For example, holographic storage systems and micro-holographic storage systems are examples of other developing storage technologies that may achieve increased capacity requirements in the storage industry.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam containing digitally encoded data (e.g., a plurality of bits) is superposed on a reference beam within the volume of the storage medium resulting in a chemical reaction which modulates the refractive index of the medium within the volume. Each bit is therefore generally stored as a part of the interference pattern. In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam.

Bit-wise holographic systems may enable the recording of closer spaced and layer-focused micro-holograms, thus providing much higher storage capacities than prior optical systems. However, the bandwidth of bit-wise holographic systems may be limited by the transfer rate of a single communication channel and the rotation speed of the holographic storage disk. For example, a typical disk rotation speed in a Blu-ray™ system at 12×BD rate may result in a single-channel transfer at approximately 430 Mbits/second. At this transfer rate, the recording time per data layer in the disk is approximately 500 seconds. Techniques for increasing transfer rates in bit-wise micro-holographic systems may be advantageous.

BRIEF DESCRIPTION

An embodiment of the present techniques provides an optical device having a plurality of optical fibers configured to transmit and output a plurality of light waves to a set of focusing elements. The set of focusing elements is configured to receive the plurality of light waves output by the plurality of optical fibers and configured to focus a plurality of illumination spots on a holographic disk. Each illumination spot of the plurality of illumination spots is positioned over one of a plurality of data tracks in the holographic disk.

Another embodiment provides an optical device configured to transmit and output a plurality of light waves. The optical device includes a first set of optical elements and a second set of optical elements. The first set of optical elements is configured to receive the plurality of light waves output by the plurality of optical fibers and configured to focus the plurality of light waves to a first plurality of light spots in a holographic disk from one side of the disk, wherein each light spot of the first plurality of light spots is positioned over one of a plurality of data tracks in the optical disk. The second set of optical elements is configured to receive the plurality of light waves output by the plurality of optical fibers and configured to focus the plurality of light waves to a second plurality of light spots in the holographic disk from the other side of the disk, wherein each light spot of the second plurality of light spots overlaps with a corresponding light spot of the first plurality of light spots and forms a hologram.

Another embodiment provides a method of recording and reading micro-holograms over parallel data tracks in a holographic disk. The method includes providing a fiber optic bundle in an optical system. The fiber optic bundle includes a plurality of optical fibers, and wherein the fiber optic bundle is configured to form focused spots in the holographic disk. The method further includes adjusting one or more components in the optical system such that the focused spots are formed over a plurality of data tracks.

DRAWINGS

These and other features, aspects, and advantages of the present invention will become better understood when the following detailed description is read with reference to the accompanying drawings in which like characters represent like parts throughout the drawings, wherein.

Figure 3A:
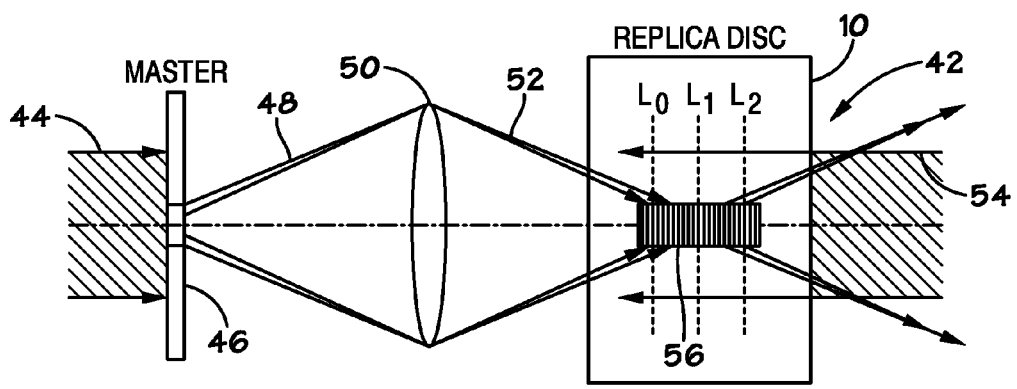
Figure 3B:
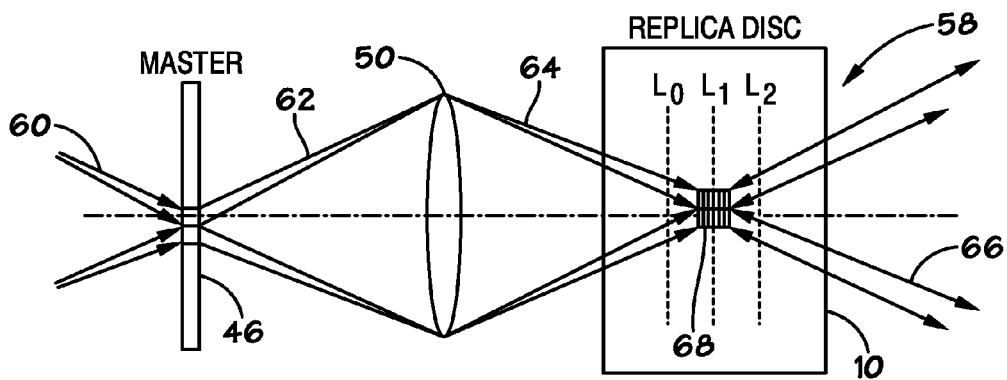
Figure 4:
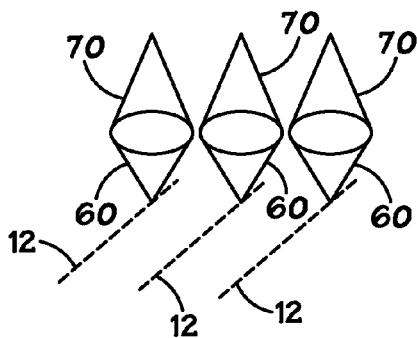
Figure 5:
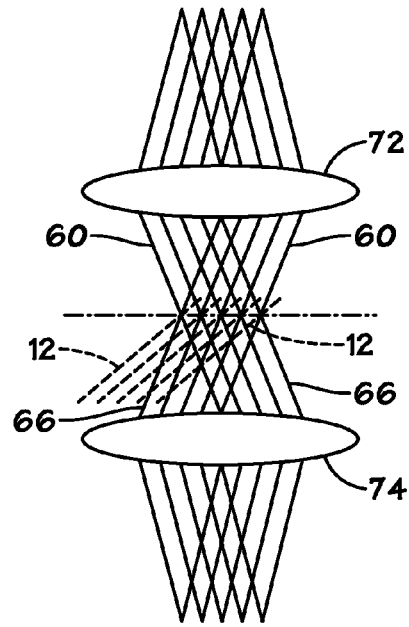
Figure 8:
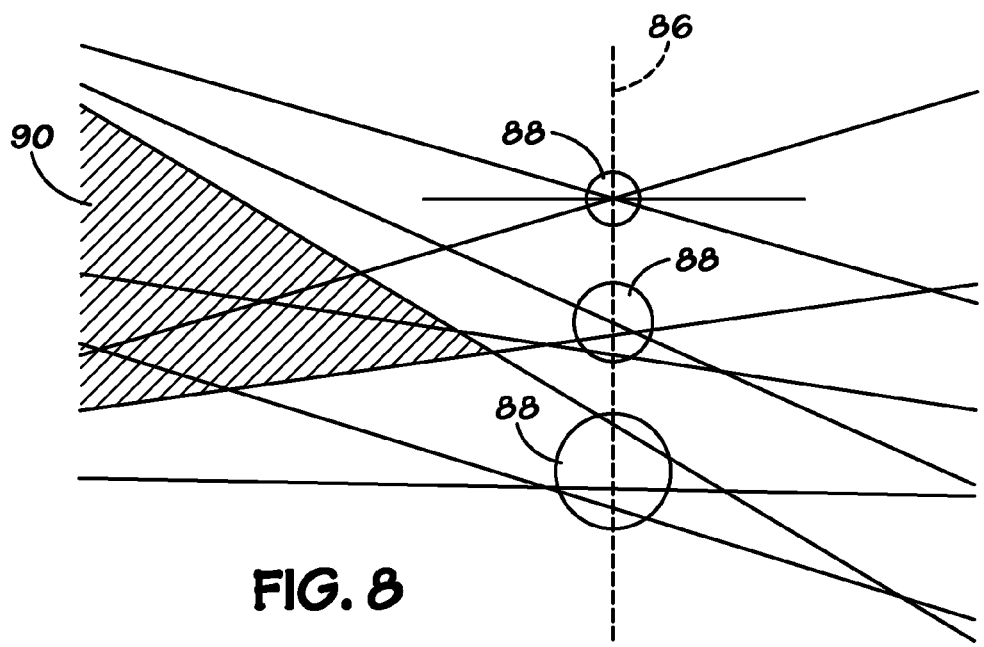
Figure 9:
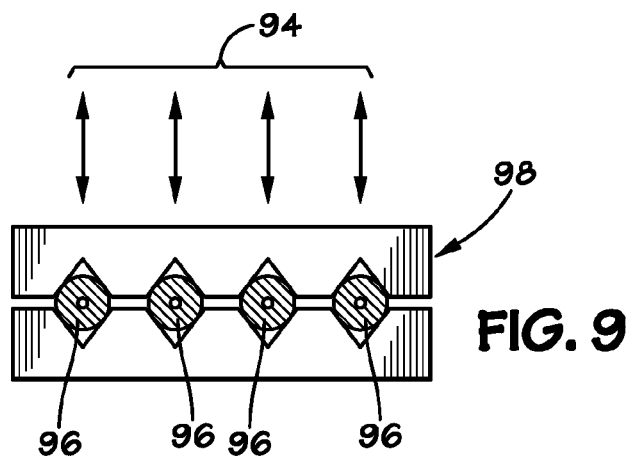
Figure 10:
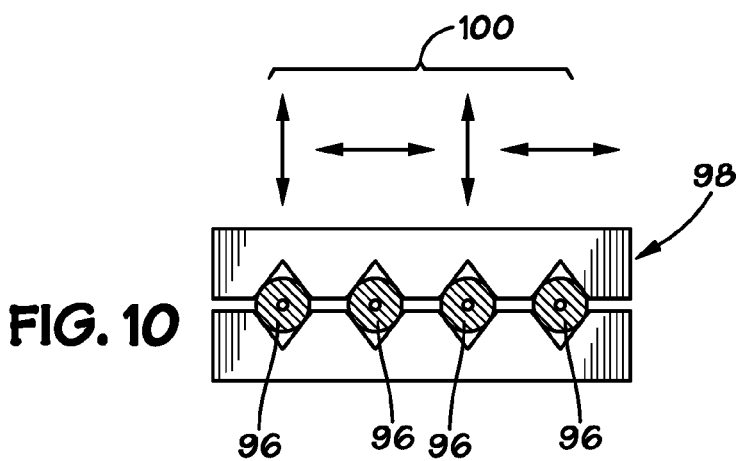
Figure 11:
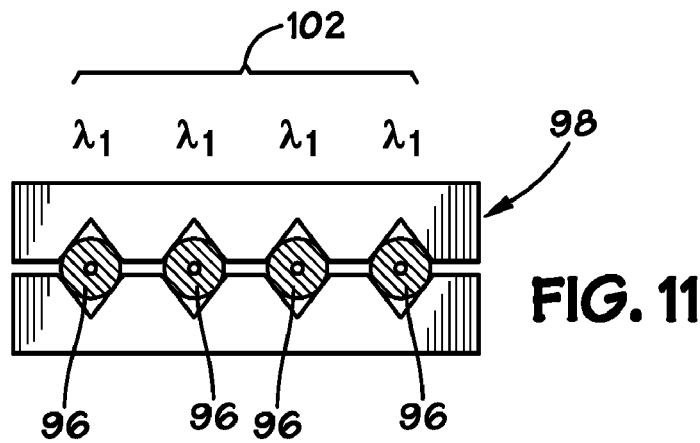
Figure 12:
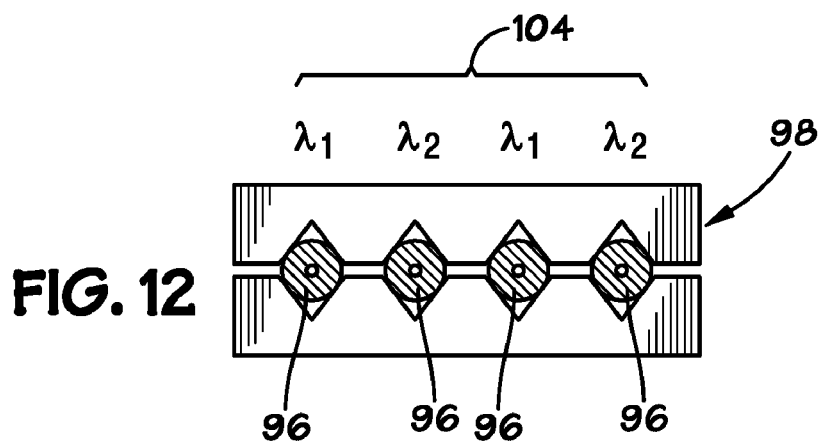
Figure 13:
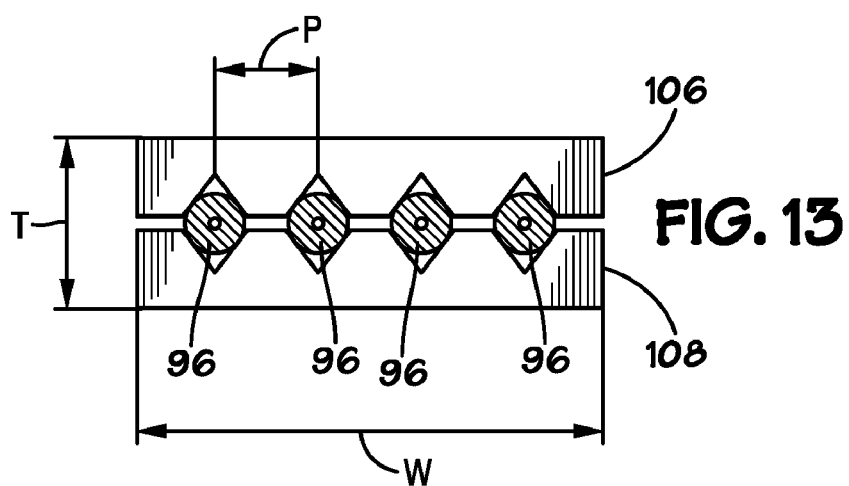
Figure 14:
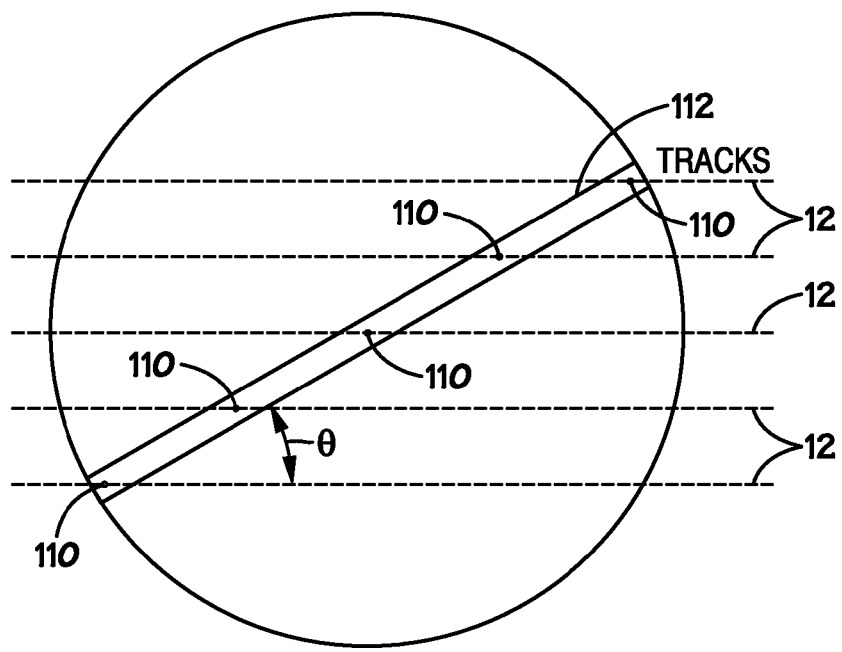
Figure 15:
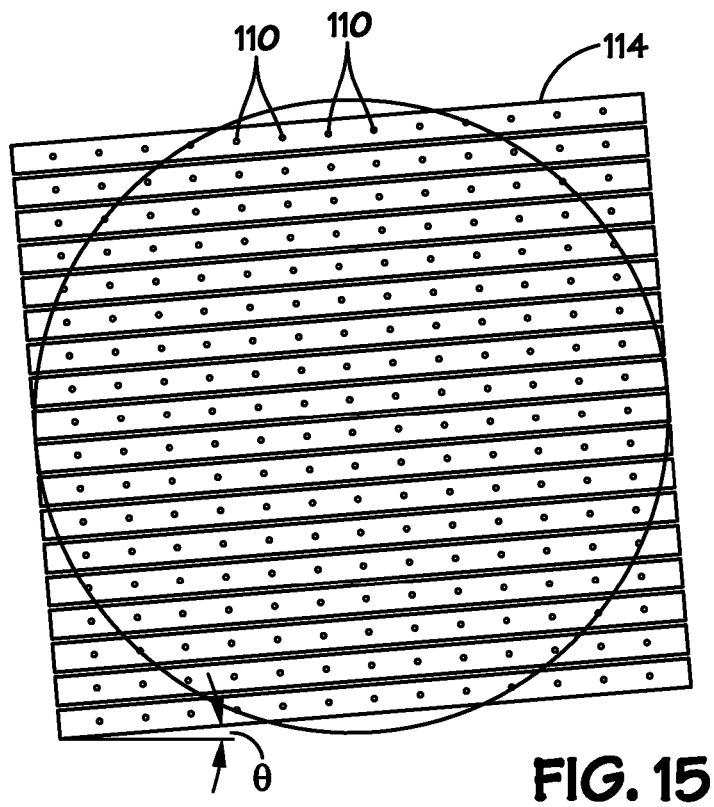

FIGS. 3A and 3B each illustrate a schematic diagram to compare a single beam replication technique and a multiple parallel beams replication technique, in accordance with embodiments;

FIG. 4 is a schematic diagram of a multi-head system recording on multiple tracks of a holographic disk in parallel, in accordance with embodiments;

FIG. 5 is a schematic diagram of a single head transmitting multiple beams to record on multiple tracks of a holographic disk in parallel, in accordance with embodiments;

FIG. 6 is a cross-sectional diagram representing various types of polarization-maintaining optical fibers (PMFs), in accordance with embodiments;

FIG. 7 is a schematic side view of multiple light waves entering a holographic disk, in accordance with embodiments;

FIG. 8 is an enlarged schematic diagram of FIG. 7 depicting interference in the holographic disk, in accordance with embodiments;

FIG. 9 is a cross-sectional diagram of a plurality of PMFs configured to transmit a plurality of light beams with aligned polarizations, in accordance with embodiments;

FIG. 10 is a cross-sectional diagram of a plurality of PMFs configured to transmit a plurality of light beams with interleaved polarizations, in accordance with embodiments;

FIG. 11 is a cross-sectional diagram of a plurality of PMFs configured to transmit a plurality of light beams at one wavelength and different spatial coherence, in accordance with embodiments;

FIG. 12 is a cross-sectional diagram of a plurality of PMFs configured to transmit a plurality of light beams with different spatial coherence and different wavelengths, in accordance with embodiments;

FIG. 13 is a cross-sectional diagram of a plurality of PMFs configured to fit in a groove fixture, in accordance with embodiments;

FIG. 14 is a schematic diagram depicting a one-dimensional fiber array tilted according to a track pitch of a holographic storage medium, in accordance with embodiments; and FIG. 15 is a schematic diagram depicting a two-dimensional fiber array tilted according to a track pitch of a holographic storage medium, in accordance with embodiments.

DETAILED DESCRIPTION

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Figure 1:
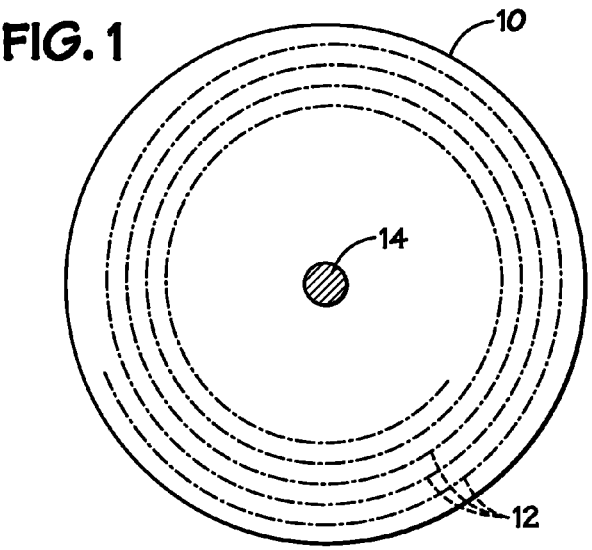
FIG. 1 illustrates an optical disk having data tracks, in accordance with embodiments.

Bit-wise holographic data storage systems typically involve recording by emitting two overlapping and interfering beams inside a recording medium (e.g., a holographic disk). Data bits are represented by the presence or absence of microscopically sized localized holographic patterns, referred to as micro-holograms, which act as volumetric light reflectors when illuminated by a focused beam. For example, the holographic disk 10 illustrated in FIG. 1 represents how data bits may be organized in a layer of the disk 10. Generally, the holographic disk 10 is a flat, round disk with one or more data storage layers embedded in a transparent plastic coating. The data layers may include any number of surfaces that may reflect light, such as the micro-holograms used for a bit-wise holographic data storage. In some embodiments, the data layers may include holographic recordable material which is responsive to the illumination intensity light beams impinged on the disk 10. For example, in different embodiments, the disk 10 materials may be threshold responsive or linearly responsive. The data layers may be between approximately 0.05 μm to 5 μm in thickness and may have a separation between approximately 0.5 μm to 250 μm.

Data in the form of micro-holograms may be generally stored in a sequential spiraling track 12 from the outer edge of the disk 10 to an inner limit, although concentric circular tracks, or other configurations, may be used. A spindle hole 14 may be sized to engage about a spindle in a holographic system, such that the disk 10 may be rotated for data recording and/or reading.

Figure 2:
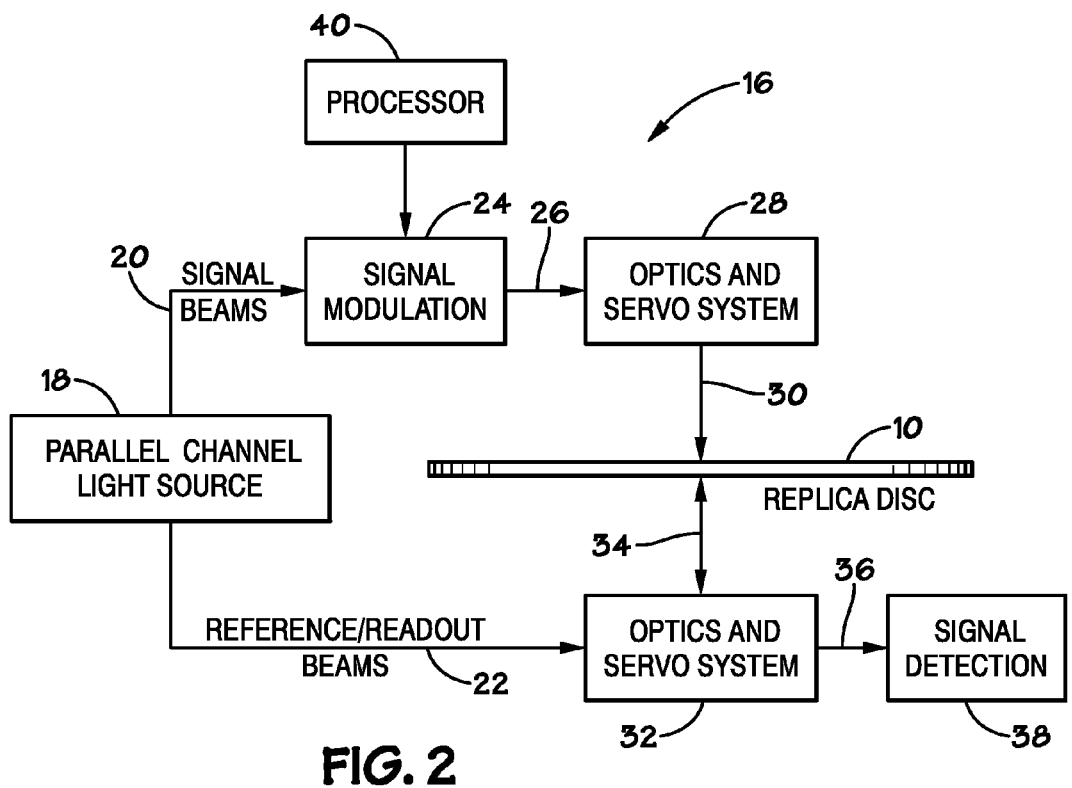
FIG. 2 is a block diagram of a micro-holographic replication system, in accordance with embodiments.

A general system of recording micro-holograms to a holographic disk 10 is provided in the block diagram of FIG. 2. The holographic system 16 includes a light source 18 which may be split into a signal beam 20 and a reference beam 22. As will be discussed, in some embodiments, the light source 18 (which may be a single light source or multiple light sources) may emit multiple parallel light beams to be recorded over parallel tracks 12 in a disk 10. The parallel source beams may also be split into parallel signal beams 20 and parallel reference beams 22. The signal beams 20 may be modulated (block 24) according to the data to be recorded on the disk 10. In some embodiments, a processor 40 may control the modulation (block 24) of the signal beams 20. The modulated signal beams 26 may be passed through an optics and servo-mechanic system 28, which may include various optical and servo-mechanic devices configured to focus the focused signal beams 30 on a particular location of the disk 10. For example, the optics and servo-mechanic system 28 may focus the focused signal beams 30 to a particular data layer or data tracks 12 in the disk 10.

The reference beams 22 may also be passed through an optics and servo-mechanic system 32 including various optics and servo-mechanic devices designed to focus the focused reference beams 34 to a particular data layer or data tracks 12 in the disk 10, such that the focused reference beams 34 overlap with the focused signal beams 34. Micro-holograms may be recorded in the holographic disk 10 in illuminated spots of an interference pattern formed by the two overlapping counter-propagating focused laser beams 30 and 34. In some embodiments, recorded micro-holograms may be retrieved from the disk 10 using the focused reference beams 34. Reflections of the focused reference beams 34, referred to as the data reflections 36, may be received at a detector for signal detection 38.

A stream of multiple micro-holograms may be recorded over a track 12 of the disk 10 by maintaining the overlapping counter-propagating focused beams to the desired track while rotating the disk 10 about a spindle positioned through the spindle hole 14. Generally, a certain degree of overlap of the counter-propagating beams is maintained to ensure that micro-holograms are accurately recorded in the appropriate track 12 and/or layer of the holographic disk 10. The optical and servo-mechanic systems 28 and 32 may be utilized to maintain a desired overlap dynamically with disk rotation during a micro-hologram recording process.

Such optical and servo-mechanical components 28 and 32 may add to the complexity of an end-user device for recording a holographic disk 10. The present techniques provide methods and systems for pre-populating a holographic disk 10 with micro-holograms such that the disk 10 may be modified and/or erased by an end-user device using a single beam exposure. Pre-populating a holographic disk may refer to recording micro-holograms during a manufacturing process of the holographic disk 10. The micro-holograms recorded during the pre-populating process may represent code, address, tracking data, and/or other auxiliary information. The pre-recorded micro-holograms may be subsequently modified and/or erased using a single beam rather than overlapping counter-propagating beams. Thus, an end-user system need not maintain overlapping counter-propagating laser beams to record data to a pre-populated holographic disk. Instead, an end-user system using a single beam may be used to record, modify, and/or erase micro-holograms on the pre-populated holographic disk.

While recording micro-holograms with counter-propagating beams to pre-populate a holographic disk may decrease the complexity of micro-hologram modification for an end user device, the process of pre-populating the disk may also be improved in accordance with the present techniques. As discussed, when pre-populating the holographic disk 10, the disk 10 is rotated in the holographic system such that the overlapping counter-propagating beams directed to the disk 10 may record micro-holograms over a selected track 12 and/or layer of the disk 10. The rotation speed of the disk 10, which is limited in part by the mechanical strength of the disk material, limits the speed (referred to as the transfer rate) at which micro-holograms can be recorded. For example, a typical disk rotation speed of a Blu-ray Disc™ may result in a transfer rate in a single-channel system of approximately 430 Mbits/second at 12× BD rate. At this transfer rate, the recording time per data layer in the disk is approximately 500 seconds.

In one or more embodiments, parallel micro-hologram recording techniques may be used to increase the transfer rate and reduce the recording time for a holographic disk 10. For example, parallel micro-hologram recording may involve directing multiple beams to a holographic disk to illuminate more than one track 12 in the disk 10. A beam may refer to a collection of light propagating in substantially the same direction through the same set of optical elements, and may include light originated from different light sources. Multiple beams may also be directed to more than one track 12 of the disk 10 from an opposite direction (i.e., counter-propagating beams) such that multiple overlapping counter-propagating beams may create an interference pattern of multiple illumination spots which result in multiple recorded micro-holograms in parallel tracks 12 of the disk 10. Furthermore, in some embodiments, the overlapping beams may interfere at a focused spot having a relatively small area with respect to the data layer plane. The focused illumination spots of the interference pattern may be separated by non-illuminated regions. By limiting the illuminated areas on a data layer, the depth spread of recorded micro-holograms may be limited to a desired size and/or limited on a desired data layer (e.g., between approximately 0.05 μm to 5 μm).

The schematic diagrams in FIGS. 3A and 3B compare two different approaches to recording micro-holograms in parallel. In FIG. 3A, the wide field illumination using a single beam approach 42 includes using a single beam 44 to illuminate a relatively wide field (e.g., spanning multiple data tracks 12) in a master disk 46. The master disk 46 may contain data to be replicated onto the replica disk 10, and spanning multiple data tracks 12 with the single beam 44 may allow data on multiple data tracks 12 to be replicated concurrently. The reflections 48 from the master disk 46 may be transmitted through an optical imaging system 50, represented as a lens in FIG. 3A, which may focus the reflections 48 and direct the focused reflections 52 to the replica disk 10. A single wide field reference beam 54 may also be directed to the opposite side of the replica disk 10, such that the focused reflections 52 and the reference beam 54 may counter-propagate and interfere to form a hologram pattern 56. The replica disk 10 may have multiple data layers, as represented by the vertical lines $L_0$, $L_1$, and $L_2$.

However, the increased field of view of the illumination of the single beams 44 and 54 generally results in an increased depth spread of the recorded hologram in the replica disk 10. The increased depth spread characteristic may refer to an increased size of a hologram which may span through a greater thickness of the disk 10 (in the direction of the single beams 44 and 54) and may span through more than one layer. For example, while the single beams 44 and 54 may both be directed to layer $L_1$, the linear material typically used for such page-based wide field illumination systems may be relatively sensitive to the wide illumination field, and the materials in adjacent layers $L_0$ and $L_2$ may also be affected by the single beams 44 and 54. Thus, increased depth spread in hologram recording may limit or decrease the data capacity of the holographic disk 10, as recording one holographic pattern may require more than one data layer.

One embodiment of the present techniques is presented in the multiple parallel beam approach 58 of FIG. 3B. Rather than illuminating a relatively wide field with a single beam, as in the single beam approach 42 of FIG. 3A, the multiple parallel beam approach 58 involves impinging a holographic disk 10 with multiple counter-propagating parallel beams. In one embodiment, multiple parallel signal beams 60 are directed to a master disk 46, and the reflections 62 from the master disk 46 may be transmitted through an optical imaging system 50, represented as a lens in FIG. 3B, which may focus the reflections 62 and direct the focused reflections 64 to the replica disk 10.

Multiple parallel reference beams 66 may also be directed to the opposite side of the disk 10. In some embodiments, the parallel reference beams 66 and the parallel signal beams 60 may be split from a common parallel channel light source 18 (FIG. 2), and in some embodiments, the parallel reference beams 66 and the parallel signal beams 60 may be transmitted from different light sources. The parallel reference beams 66 and the focused reflections 64 may counter-propagate and interfere to form an interference pattern on a data layer (e.g., data layer $L_1$) in the disk 10. The interference pattern may include multiple illumination spots (e.g., each spot may correspond to the interference of one of a pair of counter-propagating parallel beams) separated by non-illuminated regions. Each of the interference spots may form a micro-hologram 68 in the data layer $L_1$. Because only a small fraction of the data layer plane in a data layer $L_1$ is illuminated with respect to the area of the whole data layer plane (rather than a wide region in the single beam approach 42), each of the beam spots (or micro-holograms 68) in the illumination pattern may be relatively focused within a single data layer $L_1$, potentially increasing the data capacity of the disk 10.

In some embodiments, using multiple parallel beams for parallel micro-hologram recording may utilize multiple optical heads, as illustrated in FIG. 4. The optical heads 70 may emit a single beam, and multiple optical heads 70 in a replication system 16 (e.g., FIG. 2) may be arranged to each impinge a beam 60 over a data track 12 in the disk 10, such that multiple beams 60 are illuminating multiple tracks 12 in parallel. In some embodiments, each optical head may have separate optics configured to focus the beam 60 on a track 12. Further, an additional set of optical heads may be configured to impinge the disk 10 from an opposite direction, such that the parallel beams 60 emitted from each optical head 70 counter-propagate to interfere in the data tracks 12 in one layer of the disk 10. In some embodiments, the optical heads 70 may include one or more dove prisms, Penta prisms, or other optical components.

In another embodiment illustrated in FIG. 5, parallel micro-hologram recording using multiple parallel beams may utilize an optical head 72 which transmits multiple beams 60 of light in parallel, from one set of optics. In one embodiment, the multiple parallel signal beams 60 from a single optical head 72 may be transmitted through a bundle of individual fibers suitable for transmitting a beam of light, such that each beam is discrete as it is transmitted out of the optical head 72 and onto multiple tracks 12 of a disk 10. As will be discussed, the optical head 72 may include or may be coupled to imaging optics configured to reduce the illumination pattern formed by the multiple beams 60 on a data plane (e.g., one or more data layers of the disk 10). Reduction of the illumination pattern may increase the probability of registering each illumination spot to a data track 12 of the disk. In some embodiments, the optical head 72 may include a dove prism, a Penta prism, or other optical components. Counter-propagating parallel signal beams 60 may be achieved by transmitting counter-propagating parallel beams 66 from another optical head 74 having another bundle of individual fibers from the opposite side of the disk 10 or by splitting parallel beams into signal beams 60 and reference beams 66 (as discussed with respect to FIG. 2).

In one or more embodiments, a bundle of individual optical fibers may be employed to transmit multiple beams (i.e., light waves) to a holographic disk 10. For example, the fiber bundle may output the light waves either through multiple optical heads 70 or through a single optical head 72 suitable for transmitting multiple beams 60. The fiber bundle may include multiple optical fibers such as single mode fibers. In some embodiments, the fiber bundle may include multiple polarization-maintaining optical fibers (PMFs or PM fibers). A PM fiber is an optical fiber in which the polarization of linearly-polarized light waves transmitted through the fiber is maintained during propagation of the light waves. In some embodiments, a recording or counter-propagating light wave may propagate through each PM fiber to pre-record a micro-hologram on a disk 10. The light waves are typically polarized by a polarizer before being launched into the PM fiber, and depending on various factors such as the temperature and stress within the PM fiber, the polarization of the polarized light waves may be substantially maintained from an input to an output of the PM fiber.

FIG. 6 illustrates cross-sectional diagrams of three examples of PM fibers which may be used in the present techniques. The PM fibers 76, 78, and 80 may each be designed to induce stress in the fiber core 82. For example, the PM fiber 76 may be similar to the Panda PM fiber manufactured by Corning®, and the PM fiber 80 may be similar to the bow-tie PM fiber manufactured by Fibercore®. Other configurations and types of PM fibers may be used in accordance with the present techniques. The stress may be induced by various shaped stress rods 84 aligned with the core 82 throughout the length of the PM fibers 76, 78, and 80. In some embodiments, applied temperatures may result in thermal expansion of the stress rods 84 on the fiber core 82, which contribute to maintaining the polarization of light waves propagating through the PM fibers 76, 78, and 80.

By pre-recording a holographic disk 10 with a PM fiber bundle having a plurality of PM fibers 76, 78, or 80, a pattern of illuminated light spots can be created on the disk 10 to record over multiple data tracks 12 of the disk 10. As discussed, recording over multiple parallel data tracks 12 while the disk 10 is rotating increases transfer rate and decreases the time needed to pre-populate or write data to the disk 10. However, the parallelism and close physical proximity of the bundled PM fibers 76, 78, or 80 may result in interference between neighboring channels of propagating light waves. FIGS. 7 and 8 depict how interference may occur between neighboring channels. In FIG. 7, parallel signal beams 26 may pass through an optical system 28 (e.g., lens), and the focused signal beams 30 may be directed toward a disk 10. The focused signal beams 30 may focus on a plane in the disk 10 to write micro-holograms in parallel.

An enlarged illustration of FIG. 7 is provided in FIG. 8, where the focused signal beams 30 are focused on multiple illumination spots 88 on a focal plane 86. Each of the multiple illumination spots 88 may be indicative of a micro-hologram and may be focused on a different data track 12 in the disk 10. The focal plane 86 may represent one data layer or multiple data layers of the disk 10. As depicted in FIG. 8, the beams 30 overlap to form an interference region 90 within the disk 10 before focusing on the spots 88 in the focal plane 86. If the interference region 90, represented as a shaded region in FIG. 8, occurs within the disk 10, crosstalk may result, which may lead to data errors in previously recorded layers. For example, if an interference region 90 occurs on a previously recorded focal plane 92 (e.g., a previously recorded layer), data errors or erasure of data on the focal plane 92 may result.

In some embodiments, various polarization or wavelength control schemes may be used to minimize interferences and/or crosstalk of parallel data channels. Such techniques are generally discussed with respect to FIGS. 9-12. In some embodiments, a PM fiber bundle 98 may include multiple PM fibers 96. As illustrated in FIG. 9, the polarizations 94 of the light waves propagating through each of the parallel PM fibers 96 may be aligned, and crosstalk between the light waves may be reduced by injecting a light wave having smaller coherence length (approximately 30 μm) into one or more laser diodes coupled to the input of the fiber bundle 98. By reducing the coherence length of one or more of the light waves input to the fiber bundle 98, the probability of interference in the disk 10 may be decreased.

In another embodiment, crosstalk between parallel data channels may be reduced by configuring adjacent light waves to have orthogonal polarizations, as depicted in FIG. 10. The orthogonal output polarizations 100 between light waves of adjacent PM fibers 96 in the fiber bundle 98 may decrease the interference of the output light waves on the disk 10. In some embodiments, different light polarizers may be used to polarize the light waves to have orthogonal output polarizations 100, and in some embodiments, different types of PM fibers 76, 78, or 80 may be used for maintaining polarization, depending on the polarization of the parallel light waves in the fiber bundle 98. For example, the PM fiber 76 may be used for one polarization orientation while the PM fiber 78 may be used for another polarization orientation.

The wavelength of the light waves input through a PM fiber bundle 98 may also be controlled to reduce interference of the output light waves in the disk 10. For example, as depicted in FIG. 11, multiple laser diodes inputting into the fiber bundle 98 may emit at the same wavelength ($\lambda_1$) 102, and crosstalk between the light waves may be reduced by injecting a light wave having a smaller coherence length into one or more of the laser diodes. Emitting the same wavelength of light through each of the PM fibers 96 but reducing the coherence length of one or more of the light waves may reduce the interference of light waves output from the fiber bundle 98.

Furthermore, in another embodiment, crosstalk between parallel data channels may be reduced by configuring adjacent light waves to have different wavelengths, as depicted in FIG. 12. For example, multiple laser diodes may input light waves into the fiber bundle 98 at two or more wavelengths ($\lambda_1$ and $\lambda_2$) 104 to reduce interference of the output light waves in the disk 10. As explained in equation (1) below, the coherence length of a light wave is affected by the separation of wavelength between the light wave and an adjacent light wave. The larger the separation between wavelengths of two adjacent light waves, the smaller the coherent length.

$$L_{coh} = c\tau_{coh} = \frac{c}{\pi\Delta\lambda} \qquad \text{equation (1)}$$

In different embodiments, the previously discussed techniques of reducing crosstalk between parallel data channels may be used separately or in combination. For example, a fiber bundle 98 may be configured to transport light waves having the same or different output polarizations, coherence lengths, and/or wavelengths. PM fibers 96 of different characteristics may be alternating (e.g., interleaved) within the fiber bundle 98. Furthermore, each PM fiber 96 of the fiber bundle 98 may be configured to transmit a light wave having a fixed output polarization, coherence, and/or wavelength, or alternatively, each PM fiber 96 of the fiber bundle 98 may be configured to transmit light waves having various characteristics.

In some embodiments, techniques for parallel pre-recording and/or parallel recording data on a holographic disk also involves positioning the multiple laser spots so that each laser spot is registered with a data track 12 on the disk 10 throughout the recordation process. As the data track pitch is approximately 1.6 μm in a CD disk, approximately 0.74 μm for a DVD, and approximately 0.3 μm for a Blu-ray Disc™, substantial precision may be used to control the accuracy of the multiple laser spots across multiple data tracks. In one or more embodiments, a mounting structure may be used to control the positioning of PM fibers 76, 78, and 80 within the fiber bundle 98. One example of the mounting structure is the grooved structure illustrated in FIG. 13, which includes a grooved top 106 and a grooved bottom 108 sandwiching multiple PM fibers 96. Each of the grooved top 106 and grooved bottom 108 has slanted faces which hold the PM fibers 96 in position. In one embodiment, the center-to-center movement of adjacent PM fibers 96 can stay within approximately +/−0.25 μm. Since a fiber bundle 98 directs the output light to a focal plane with approximately a 1:5 reduction, the final positioning tolerance on a focal plane can be approximately +/−0.05 μm, which is substantially smaller than the Blu-ray Disc™ track pitch of approximately 0.3 μm.

The center-to-center spacing (i.e., the pitch) of adjacent PM fibers 96 is generally approximately 20 μm to 250 μm. However, a standard fiber bundle 98 pitch is much larger than the pitch of a Blu-ray Disc™ (at 0.3 μm). In one or more embodiments, adjacent data tracks 12 in a holographic disk 10 may be recorded in parallel by rotating the fiber bundle 98. The rotational angle of the fiber bundle 98 may be adjusted to control (e.g., decrease) the spacing between illuminated spots on the disk 10. For example, the relationship between the pitch of the PM fibers 96 in the fiber bundle 98, the rotational angle of the fiber bundle 98, and the pitch of the tracks 12 in the disk 10 may be represented in equation (2) below:

$$P_{track} = P_{bundle} \sin \theta \quad \text{equation (2)}$$

where $P_{track}$ is the pitch of the tracks 12 in a disk 10, $P_{bundle}$ is the pitch of the PM fibers 96 in the fiber bundle 98, and θ is the angle in which the fiber bundle 98 is rotated.

In different embodiments, different holographic systems may involve different spacing between data tracks 12. In accordance with the present techniques, the fiber bundle 98 may be rotated in various degrees along the propagation of beam propagation through the fiber bundle 98 to achieve a desired track spacing for the illuminated spots output by the fiber bundle 98. Furthermore, an opposite fiber bundle 98 may also be rotated or configured to output counter-propagating light waves which substantially overlap on data tracks 12 in a data plane 86 from an opposite direction.

Rotating a fiber bundle 98 to form illumination spots over tracks 12 having a smaller track pitch is provided in FIG. 14. In some embodiments, the fiber bundle 98 may be in the form of a one-dimensional array 112. The array 112 may have a fiber spacing of 127 μm and may be rotated at an angle θ of 30° to form illumination spots 110 substantially along the tracks 12. The angle θ is based on the track pitch $P_{track}$, and a larger fiber bundle pitch $P_{bundle}$ may require a greater rotational angle θ to form illumination spots on a disk 10 having a smaller track pitch $P_{track}$.

In some embodiments, the fiber bundle 98 may be in the form of a two-dimensional fiber array, as illustrated in FIG. 15. The 2-D fiber array 114 may have a fiber spacing of 80 μm. Because the 2-D fiber array 114 may have a smaller track pitch than the 1-D fiber array 112 discussed in FIG. 14, the 2-D fiber array 114 may be rotated at a smaller angle θ of 2.5°.

In one or more embodiments, the light transmitted through the fiber bundle 98 to a disk 10 or to a one or more data layers in the disk 10 may also be further focused on the desired data tracks 12 by using imaging optics coupled to the optical head (e.g., optical head 72 from FIG. 5) transmitting the multiple light waves. The optical head 72 may include or may be coupled to imaging optics configured to reduce the illumination pattern formed by the multiple beams output from the fiber bundle 98 on a data plane (e.g., one or more data layers of the disk 10). Reducing the size of the illumination pattern may increase the probability of registering each illumination spot to a data track 12 of the disk. In some embodiments, the factor by which the illumination pattern is reduced compared to the original output from the fiber bundle 98, referred to as the image reduction factor, may be approximately 2:1 to 10:1.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical device, comprising:
a plurality of multiple polarization maintaining optical fibers configured to transmit and output a plurality of light waves; and
a set of optical elements configured to receive the plurality of light waves output by the plurality of optical fibers and configured to focus the plurality of output light waves to a plurality of illumination spots in an optical disk, wherein each illumination spot of the plurality of illumination spots is positioned over one of a plurality of data tracks in the optical disk.

2. The device of claim 1, wherein the plurality of data tracks comprises substantially parallel data tracks.

3. The device of claim 2, wherein the plurality of data tracks comprises substantially adjacent data tracks.

4. The device of claim 2, wherein the plurality of data tracks is in a same data layer of the optical disk.

5. The device of claim 1, wherein the plurality of data tracks is located in more than one data layer of the optical disk.

6. The device of claim 1, wherein the plurality of illumination spots is substantially limited to one data layer in the optical disk.

7. The device of claim 1, wherein the plurality of illumination spots is distributed in more than one data layer in the optical disk.

8. The device of claim 1, where the plurality of optical fibers are single mode fibers.

9. The device of claim 1, where the plurality of optical fibers are polarization maintaining (PM) fibers.

10. The device of claim 1, where the plurality of optical fibers is bundled together using a V-grooved structure.

11. The device of claim 10, wherein the plurality of optical fibers is bundled together such that a distance between adjacent fibers is between approximately 20 µm-250 µm.

12. The device of claim 10, wherein the plurality of optical fibers is bundled together in a mount, wherein the mount is rotatable along an axis of beam propagation.

13. The device of claim 1, wherein the plurality optical fibers is configured in a one-dimensional array.

14. The device of claim 1, wherein the plurality of optical fibers is configured in a two-dimensional array.

15. The device of claim 1, wherein the plurality of optical fibers is configured to transmit a plurality of light waves having one coherence value.

16. The device of claim 1, wherein the plurality of optical fibers is configured to transmit a plurality of light waves having more than one coherence value.

17. The device of claim 1, wherein the plurality of optical fibers is configured to transmit a plurality of light waves having one polarization orientation.

18. The device of claim 1, wherein the plurality of optical fibers is configured to transmit a plurality of light waves having more than one polarization orientation.

19. The device of claim 1, wherein the plurality of optical fibers is configured to transmit a plurality of light waves having one wavelength.

20. The device of claim 1, wherein the plurality of optical fibers is configured to transmit a plurality of light waves having more than one wavelength.

21. The device of claim 1, wherein the set of optical elements comprises imaging optics configured to focus the plurality of light waves output by the plurality of optical fibers to the plurality of illumination spots in the optical disk.

22. The device of claim 21, wherein the imaging optics has an image reduction factor between approximately 2:1 and 10:1.

23. The device of claim 1, wherein the set of optical elements comprises a single optical head configured to receive the plurality of light waves.

24. The device of claim 1, wherein the set of optical elements comprises multiple optical heads, wherein each of the multiple optical heads is configured to receive a respective subset of the plurality of light waves.

25. An optical device, comprising:
a plurality of optical fibers configured to transmit and output a plurality of light waves; and
a first set of optical elements configured to receive the plurality of light waves output by the plurality of optical fibers and configured to focus the plurality of light waves to a first plurality of light spots in a holographic disk from one side of the disk, wherein each light spot of the first plurality of light spots is positioned over one of a plurality of data tracks in the optical disk; and
a second set of optical elements configured to receive the plurality of light waves output by the plurality of optical fibers and configured to focus the plurality of light waves to a second plurality of light spots in the holographic disk from the other side of the disk, wherein each light spot of the second plurality of light spots overlaps with a corresponding light spot of the first plurality of light spots and forms a hologram.

26. The device of claim 25, wherein one or more of the first set of optical elements and the second set of optical elements includes a dove prism or a Penta prism.

27. The device of claim 25, where the plurality of optical fibers are single mode fibers.

28. The device of claim 25, where the plurality of optical fibers are polarization maintaining (PM) fibers.

29. The device of claim 25, where the plurality of optical fibers is bundled together using a V-grooved structure.

30. The device of claim 25, wherein the plurality of optical fibers is configured in a bundle, wherein the bundle is rotatable to form interference spots approximately 0.3 µm apart in a radial axis of the optical disk.

31. The device of claim 25, wherein the first set of optical elements and the second set of optical elements each comprise imaging optics having an image reduction factor between approximately 2:1 and 10:1.

32. A method of recording and reading micro-holograms over parallel data tracks in a holographic disk, the method comprising:
providing a fiber optic bundle in an optical system, wherein the fiber optic bundle comprises a plurality of multiple polarization maintaining optical fibers, and wherein the fiber optic bundle is configured to form focused spots in the holographic disk; and
adjusting one or more components in the optical system such that the focused spots are formed over a plurality of data tracks.

33. The method of claim 32, wherein the focused spot comprises a data bit position where a micro-hologram is formed or not formed.

34. The method of claim 32, wherein adjusting one or more components in the optical system comprises rotating the fiber optic bundle such that the focused spots are formed over a plurality of data tracks.

35. The method of claim 32, wherein adjusting one or more components in the optical system comprises rotating a dove prism or a penta prism.

36. The method of claim 32, comprising:
inputting a first light wave into a first optical fiber of the plurality of optical fibers; and
inputting a second light wave into a second optical fiber of the plurality of optical fibers.

37. The method of claim 36, wherein the first light wave and the second light wave have the same or orthogonal polarizations.

38. The method of claim 32, wherein the first light wave and the second light wave have substantially the same wavelength.

39. The method of claim 32, wherein the first light wave and the second light wave have substantially the same coherence length.

40. The method of claim 32 wherein the first light wave and the second light wave have one or more of a different wavelength and a different coherence length.

41. The method of claim 32, wherein the first light wave and the second light wave are generated from different light sources.

42. The method of claim 32, wherein the first light wave and the second light wave are generated from a common light source.

43. The method of claim 32, wherein the light sources are one or more of a fiber coupled diode laser, a helium laser, a krypton laser, or a dye laser.

44. The method of claim 32, wherein adjusting one or more components in the optical system comprises forming the focused spots to have an image reduction factor between approximately 2:1 and 10:1.

* * * * *